3,247,055
INSECT CHEMOSTERILANT

Everett E. Gilbert, Morris Township, Morris County, N.J., assignor to Allied Chemical Corporation, New York, N.Y., a corporation of New York
No Drawing. Filed Oct. 28, 1963, Ser. No. 319,594
10 Claims. (Cl. 167—30)

This invention relates to a new method for controlling undesirable insect reproduction and, more particularly, relates to the use of triphenyltin compounds as insect chemosterilants in the regulation of insect population.

The use of the sterility principle for insect control among one or both members of the species is relatively new and was first successfully employed in the eradication of the screwworm fly (*Cochliomyia hominivorax* (Coquerel)) on the island of Curacao and southeastern part of the United States. This method of insect control possesses vast advantages over simple kill procedures since any beneficial effect that the insect imparts to its natural environment is preserved. Moreover, sterile insects compete with normal insects to reproduce which, in effect, further decreases the possibility for population growth.

Known techniques employing the sterilization principle, however, possess various inherent disadvantages. In the aforementioned eradication of the screwworm fly, male members of the species were sterilized by exposure to gamma radiation followed by release into the area wherein insect reproduction was to be controlled. The irradiation technique possesses obvious limitations. It requires mass release of sterilized insects which often may be undesirable or not even feasible. It requires a rather expensive, uniquely designed plant with specialized equipment to rear, transport and irradiate the insects and then demands means to dispense the packaged, sterilized insects. In many cases the irradiation technique in effecting sterilization drastically reduces the sexual competitiveness of the insects and even kills them. On the other hand, commercial chemosterilants incorporated in dry feed such as N-p-[(2,4-diamino - 6 - pteridylmethyl)methylamino]-benzoyl glutamic acid, i.e. "Ent. 25299," must be administered to only newly emerged adult insects. If such insects feed upon an untreated diet prior to the administration of Ent. 25299, sterilization of the insects is not secured. Thus, use of this chemosterilant requires the obtainment of newly emerged adult insects followed by sterilization by employment of treated feed prior to the cumbersome procedure of release into their natural environment in order to secure a significant decrease of insect population.

It has now been found that triphenyltin hydroxide, triphenyltin halides, and triphenyltin esters are effective female chemosterilants which need not be administered to newly hatched adult insects, and which effects a substantial decrease in insect population.

Accordingly, it is a principal object of the present invention to provide a method for controlling an undesirable insect population.

It is a further object of the present invention to provide triphenyltin hydroxide, triphenyltin halides, and triphenyltin esters as female insect chemosterilants. Other objects and advantages will become apparent from the following description.

In accordance with the present invention undesirable insect population growth may be controlled by a method which comprises feeding to said insect a compound selected from the group consisting of triphenyltin hydroxide, triphenyltin halides, and triphenyltin esters in a concentration sufficient to effect sterilization of the insect. The triphenyltin halides and triphenyltin esters of the present invention are derivatives of the halogen acids, substituted and nonsubstituted carboxylic acids, aromatic amino acids, carbothiolic acids, carbothionic acids and carbodithioic acids.

Illustrative of these acids are: hydrofluoric, hydrobromic, hydriodic, hydrochloric, acetic, propionic, butyric, stearic, acrylic, crotonic, oleic, linoleic, linolenic, benzoic, salicylic, furoic, picolinic, thioacetic, adipic, phthalic, and the like.

The amount of triphenyltin chemosterilant fed to the insect is determined upon consideration of factors such as insect fecundative capabilities, climatic conditions, concentration of insect population and other insect species' characteristics. Generally speaking, concentrations of triphenyltin chemosterilant in the range of from about 0.004 to 0.06 percent by weight based on the amount of feed employed has been found to impart effective sterilization to the insect population sought to be controlled. The concentration of the triphenyltin chemosterilant used should be sufficient to effect sterilization to a significant degree and less than insecticidal concentration since it is not desired to effect substantial mortality among the insect populus. Thus, the concentration utilized should effect tolerable mortality rate, i.e. not greater than 70%. Illustrative of ideal concentration is that amount of triphenyltin chemosterilant used in the Examples set forth below. In population control of insects such as the common adult housefly (*Musca domestica*) concentrations below 0.004% did not secure effective sterilization whereas concentrations in excess of 0.06 realized an insect mortality rate in excess of 70%. As previously mentioned, the various factors such as the species to be controlled, environment, biological resistance and activity dictate the concentration range of chemosterilant to be used in order to obtain irreversible sterilization by a simple and economical method.

Generally speaking, the feed-bait employed is a substance to which the insect is attracted. Any substance may be employed provided its properties present a desirable substance which the insect consumes. The feed-bait may comprise non-fat dry milk, granulated sugar, powdered eggs, malt, molasses, yeast, or other feeding sources or combinations thereof having incorporated into such feed-bait triphenyltin chemosterilant. The physical form of such feed is not critical and may be introduced into the insect environment in solution or solid form. In the case of a feed-bait solution, an aqueous solution may be introduced into the environment by conventional means such as spraying or in solid form such as a dust or granulated substance. The solution feed method should comprise an alluring substance, although not necessarily of nutritious value, and the solvent should be free of any effective insecticidal properties. The solid feed-bait procedure utilizes an alluring substance which is coated or impregnated with the triphenyltin chemosterilant. Such a solid feed-bait carrier may readily be prepared by dissolving the solid feed in a solution comprised of the triphenyltin chemosterilant and a suitable solvent followed by slight agitation. The solvent is removed by distillation or evaporation and impregnated feed-carrier isolated. For application as a dust or as granules, the treated feed-bait is pulverized by conventional means. The following examples are given to more fully illustrate the present invention. In the examples, parts are by weight.

A. PREPARATION OF FEED-BAIT

A solid feed-bait carrier comprised of 6 parts of powdered nonfat dry milk, 6 parts granulated sugar and 1 part powdered egg is treated with the desired triphenyltin chemosterilant as an acetone solution. After agitation, the acetone is removed by distillation and the resulting treated solid feed is ground to a powder using a mortar and pestle.

B. EGG VIABILITY TEST

Into an emergence cage containing 50 housefly (*Musca domestica*) pupae is placed the solid feed-bait. As a check, a similar emergence cage containing 50 fly pupae are treated with the identical feed-bait without having incorporated therein a triphenyltin chemosterilant. Periodic examination of the emergence cages is made to determine the condition of the flies, degree of emergence and toxic effects. After a period of nine days, an oviposition medium is placed in each cage and the following day the medium is examined for eggs. Egg viability is determined by inspecting the medium for growing larvae two to three days after oviposition.

C. LARVICIDAL TEST

Housefly larvae are treated with the feed-bait having incorporated therein a triphenyltin chemosterilant in a suitable rearing medium. The dry-feed bait is moistened and placed in a glass tumbler and seeded with twenty-five three-day-old larvae. The tumbler is then placed in a holding cage until all adults have emerged and died of starvation, at which time the medium is examined for the purpose of recording fly pupation and adult emergence as well as any signs of delay or abnormality of development.

D. ANTIFERTILITY TEST 25 parts of dry larval medium is saturated with a solution comprised of 50 parts malt-yeast water solution containing the triphenyltin chemosterilant in solution or as a suspended material. This malt-yeast water solution is prepared by admixing 450 parts of water with 25 parts of yeast and 10 parts of malt. The treated medium is placed in a glass tumbler and approximately 100 eggs are added to each tumbler and then placed in emergence cages. As a checking means, an identical procedure is set up with the exception of triphenyltin chemosterilant is not incorporated into the treated medium. The emergence cages are periodically examined to determine whether or not eggs are hatched and for larval abnormalities and mortality. After the adults in the checking procedure have emerged, the experimental cages are examined for emergence and the medium examined for larvae or pupae. Four or five days after emergence the flies are placed in an oviposition medium and the resulting eggs checked for hatching.

E. OVIPOSITION MEDIA

A typical oviposition medium employed, for example, for the common housefly comprises 1.5 parts of malt syrup, 3.5 parts of yeast, 65 parts water and 30 parts of dry grain consisting of 33½ percent by weight alfalfa meal and 66⅔ percent by weight brewers grains. The medium is thoroughly admixed and placed in a glass jar and offered to the caged insects to be tested for oviposition for a sufficient period of time, usually a period of 24 hours. At the end of this period, the eggs are counted.

The above procedure and test methods were utilized in determining the effectiveness of triphenyltin chemosterilants on the common adult housefly (*Musca domestica*) and the following data, set forth below in Table I, were obtained.

*Table I*

| | Chemosterilant | Conc. percent by weight in feed-bait | Percent kill | | Eggs laid | Larval condition |
|---|---|---|---|---|---|---|
| | | | 7 days | 9 days | | |
| 1 | Triphenyltin chloride | 0.0625 | 35 | 70 | None | |
| | | 0.0313 | 0 | 13 | Yes | 0. |
| | | 0.0156 | 0 | 4 | Yes | 0. |
| | | 0.0078 | 0 | 2 | Many | 0. |
| | | 0.0039 | 0 | 2 | Yes | Normal. |
| 2 | Triphenyltin acetate | 0.0313 | 2 | 31 | Yes | None. |
| | | 0.0078 | 0 | 0 | Yes | Do. |
| 3 | Triphenyltin hydroxide | 0.0625 | 43 | N.D. | None | |
| | | 0.0039 | 2 | N.D. | Many | None. |
| 4 | Triphenyltin 4-acetamido-benzoate | 0.0625 | 0 | N.D. | None | Do. |
| | | 0.0039 | 0 | N.D. | Many | Normal. |
| 5 | Triphenyltin N,N'-dimethyldithiocarbamate | 0.0625 | 2 | N.D. | None | None. |
| | | 0.0039 | 0 | N.D. | Many | Normal. |

N.D. = Not determined.

The effectiveness of the triphenyltin chemosterilants of the present invention as larvacides and chemosterilants in the reduction of insect population is further illustrated by the following data set forth below in Table II.

*Table II*

| | Chemosterilant | Conc. percent by weight in feed-bait | Number of pupae | Number of adult flies emerged | Number of eggs produced | Number of eggs hatched (estimate) |
|---|---|---|---|---|---|---|
| 1 | None | | 108 | 101 | 1,600 | 1,525–1,600 |
| 2 | Triphenyltin acetate | 0.0078 | 0 | | | |
| | | 0.0039 | 58 | 57 | 410 | 350 |
| 3 | Triphenyltin chloride | 0.0078 | 0 | | | |
| | | 0.0039 | 33 | 32 | 210 | 135–160 |
| 4 | Triphenyltin hydroxide | 0.0078 | 0 | | | |
| | | 0.0039 | 31 | 29 | 165 | 155–165 |
| 5 | Triphenyltin 4-acetamidobenzoate | 0.0078 | 11 | 9 | 275 | 150–165 |
| | | 0.0039 | 95 | 91 | 1,200 | 1,150–1,200 |
| 6 | Triphenyltin N,N'-dimethyldithio-carbamate | 0.0078 | 4 | 3 | 0 | |
| | | 0.0039 | 8 | 8 | 115 | 80–85 |

This invention may be embodied in other forms or carried out in other ways without departing from the spirit or essential characteristics thereof. The present embodiment is, therefore, to be considered in all respects as illustrative and not restrictive, the scope of the invention being indicated by the appended claims.

I claim:

1. A method of controlling undesirable insect population growth which comprises feeding to said insect a chemosterilant selected from the group consisting of triphenyltin hydroxide; triphenyltin halides; and triphenyltin esters selected from the group consisting of triphenyltin 4-acetamido-benzoate, triphenyltin N,N'-dimethyl-dithiocarbamate, triphenyltin acetate, triphenyltin propionate, triphenyltin butyrate, triphenyltin stearate, triphenyltin acrylate, triphenyltin crotonate, triphenyltin oleate, triphenyltin linoleate, triphenyltin linolenate, triphenyltin benzoate, triphenyltin salicylate, triphenyltin furoate, triphenyltin picolinate, triphenyltin thioacetate, triphenyltin adipate, and triphenyltin phthalate.

2. A method in accordance with claim 1 wherein the triphenyltin ester is triphenyltin chloride.

3. A method in accordance with claim 1 wherein the triphenyltin ester is triphenyltin acetate.

4. A method in accordance with claim 1 wherein triphenyltin ester is triphenyltin acetamidobenzoate.

5. A method in accordance with claim 1 wherein the chemosterilant is triphenyltin hydroxide.

6. A method in accordance with claim 1 wherein the triphenyltin ester is triphenyltin N,N'-dimethyldithiocarbamate.

7. A method in accordance with claim 1 wherein the triphenyltin chemosterilant is incorporated in a feedbait carrier.

8. A method in accordance with claim 7 wherein the concentration of the chemosterilant is in the range of from about 0.004 to about 0.06 percent by weight of the carrier.

9. A method in accordance with claim 1 wherein the chemosterilant is fed to the insect in the form of a solution.

10. A method in accordance with claim 1 wherein the chemosterilant is fed to the insect in the form of a solid.

References Cited by the Examiner

UNITED STATES PATENTS

| | | | |
|---|---|---|---|
| 3,097,999 | 7/1963 | Kospweins | 167—30 |
| 3,140,977 | 7/1964 | Duyfjes | 167—30 |
| 3,159,531 | 12/1964 | Bruckner | 167—30 |

JULIAN S. LEVITT, *Primary Examiner.*

Notice of Adverse Decision in Interference

In Interference No. 96,214 involving Patent No. 3,247,055, E. E. Gilbert, Insect chemosterilant, final judgment adverse to the patentee was rendered Nov. 20, 1968, as to claims 1, 2, 3, 5, 6, 7, 8, 9 and 10.

[*Official Gazette March 11, 1969.*]